INVENTOR.
LEONARD R. PURDY
BY Newton, Hopkins,
Jones & Ormsby
ATTORNEYS

United States Patent Office 3,523,990
Patented Aug. 11, 1970

3,523,990
METHOD OF MOLDING EXPANDABLE POLY-STYRENE PELLETS TO FORM OBJECTS WITHOUT SURFACE PROTRUSIONS
Leonard R. Purdy, % Lanier Industries, Inc.,
Briarwood Road, Oakwood, Ga. 30566
Filed Feb. 13, 1968, Ser. No. 705,123
Int. Cl. B29d 27/08
U.S. Cl. 264—51                    1 Claim

ABSTRACT OF THE DISCLOSURE

A method of molding expandable polystyrene pellets. The method comprises enclosing the pellets of expandable polystyrene in a mold cavity, injecting steam into the mold cavity through open ended tubular nozzles extending into the mold cavity, cooling the mold while maintaining the position of the nozzles and removing the molded object which contains recesses formed by the tubular nozzles and nipples in the recesses which lie below the surface of the object.

BACKGROUND OF THE INVENTION

When molding polystyrene or other expandable substances, the polystyrene expands to fit the mold cavity, and tends to further expand and pass through the steam ducts of the mold cavity. When the molded polystyrene is cooled, the portion thereof which entered the steam ducts solidifies with the main body of the molded polystyrene, and when the sections of the mold are separated, the portion of the polystyrene which entered the steam ducts appears as bumps or small protrusions on the surface of the molded objects. Since the protrusions are usually relatively small in size with respect to the molded objects, they may not be objectionable or hinder the function of the molded object; however, in certain instances it is desirable to form the molded object without the protrusions. For instance, in molding polystyrene wings and other parts for drone airplanes, the surfaces of the wings should be formed without protrusions which might act as spoilers. Even when a protective covering is placed over the surface of the wings any protrusions in the surfaces of the polystyrene might cause a lump in the covering, or penetrate the covering. Of course, there are other situations which the absence of such protrusions is critical, or merely desirable.

SUMMARY OF THE INVENTION

Briefly described, the present invention comprises a molding method and apparatus for forming a polystyrene object with virtually smooth surfaces. The method includes the steps of enclosing concentrated polystyrene pellets in a mold cavity, injecting steam into the mold cavity through nozzles extending into the mold cavity, expanding the polystyrene in the mold cavity to take the shape of the cavity and the nozzles, cooling the mold, and removing the mold and the nozzles from the expanded polystyrene. The apparatus utilized is a sectional mold defining a mold cavity, steam plenum chambers in the mold sections, a plurality of steam ducts extending from the steam plenum chambers to the mold cavity, and a nozzle at the end of each steam duct extending into the mold cavity in such a manner that the nozzles will normally protrude into the object molded in the mold cavity. The object molded by the above method and apparatus will have, in the place of the normal protrusions or bumps in its surface, a plurality of recessed protrusions or bumps. The nozzles will create recesses in the molded object, and the protrusions or bumps normally created in the surface of the molded object will be present in the recesses, but will be of a height so that they do not extend beyond the surface of the molded object. Also, in some instances the nozzles of the mold will be chosen so that the depth of the recesses formed thereby will be approximately equal to the height of the protrusions, so that the protrusions will terminate approximately in the plane of the surface of the object. Thus, the outer surface of the protrusions will be substantially coextensive with the surface of the molded object.

It is an object of this invention to provide a method and apparatus for molding polystyrene and other expandable substances without creating protrusions or bumps in the surface of the molded object.

Another object of this invention is to provide a method of molding polystyrene and other expandable substances without creating protrusions or bumps which extend outwardly of the surface of the molded object.

Another object of this invention is to provide a product of molded polystyrene or another expandable substance, with the product having no protrusions or bumps in its exterior surface.

Other objects, features and advantages of the present invention will become apparent upon reading the following specification, when taken in conjunction with the accompanying drawing.

DESCRIPTION OF THE PREFERRED EMBODIMENT

Figure 1:
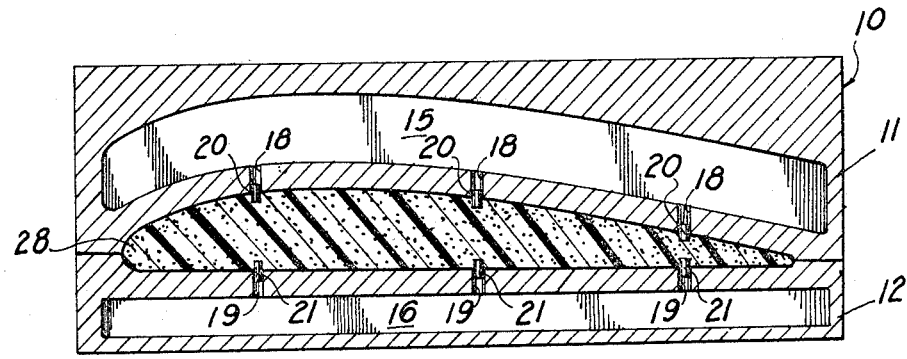
FIG. 1 is a schematic side cross-sectional view of a mold and the object molded therein.
Figure 2:
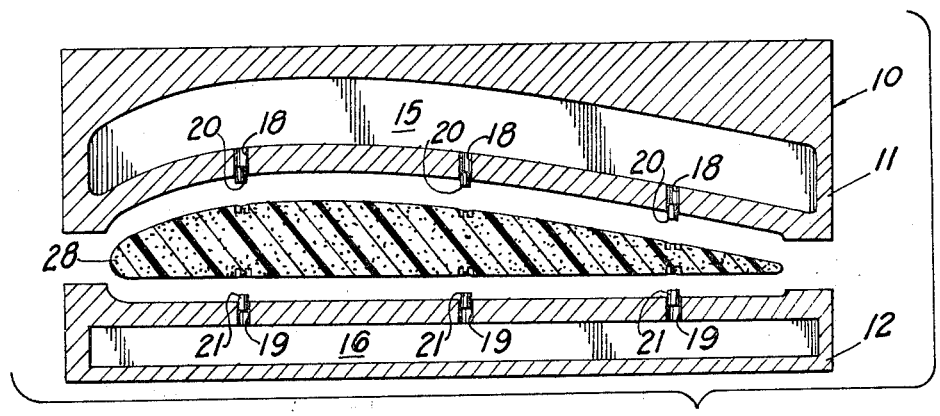
FIG. 2 is a schematic side cross-sectional view similar to FIG. 1, but showing the sections of the mold withdrawn from the molded object.

Referring now more particularly to the drawing, in which like numerals indicate like parts throughout the several views, FIG. 1 shows a sectional mold 10 which comprises upper mold section 11 and lower mold section 12. When mold sections 11 and 12 are properly positioned or closed, they define a mold cavity 14. Upper mold section 11 defines an internal steam cavity or plenum chamber 15, while lower mold section 12 defines internal steam cavity or plenum chamber 16. Ducts or conduits 18 extend between steam plenum chamber 15 and mold cavity 14, while ducts or conduits 19 extend between steam plenum chamber 16 and mold cavity 14. Nozzles 20 are inserted into ducts 18 and extend into mold cavity 14, while nozzles 21 are inserted into ducts 19 and extend into mold cavity 14. Nozzles 20 and 21 are small lengths of tubing and extend a short distance into mold cavity 14.

When an object is to be formed with the use of sectional mold 10, concentrated polystyrene pellets are placed in mold cavity 14, the mold sections positioned in sealing relationship, as shown in FIG. 1, and steam is introduced to steam plenum chambers 15 and 16. The steam passing through ducts 18 and 19 enters mold cavity 14 from nozzles 20 and 21 in the form of jets, and the pellets of polystyrene expand to fill mold cavity 14. When the flow of steam is terminated, the polystyrene will continue to expand for a period of time, and this continued expansion causes small portions of the polystyrene to enter the openings of nozzles 20 and 21. Of course, since nozzles 20 and 21 extend into mold cavity 14 a short distance, the product formed by the mold will have small recesses 24 in its surface which conform in size and shape to nozzles 20 and 21. Also, the portion of the polystyrene which entered the opening of each nozzle will appear as a protrusion or bump 25; however, since the protrusion or bump is located in the bottom of the recess formed by a nozzle, the protrusion will not form a bump in the surface of the molded object. Of course, the molded object will have a plurality of small recesses in its surface, which are formed by nozzles 20 and 21. Each recess 24 will be partially filled by a protrusion 25.

Nozzles 20 and 21 can be carefully chosen so as to regulate the depth of recesses 24 and the height of protrusions 25 within the recesses. For instance, by utilizing nozzles which extend far into mold cavity 14 and which have a large outside diameter and a relatively small passage therethrough, a deep recess can be created with a small protrusion therein. Conversely, by using nozzles which extend a short distance into the mold cavity, and which are of small outside diameter and define a relatively large passage therethrough, the depth of recess 24 will be relatively shallow and the height of protrusion 25 will be such that its outer end terminates substantially in the plane of the surface of the molded object.

Figure 3:
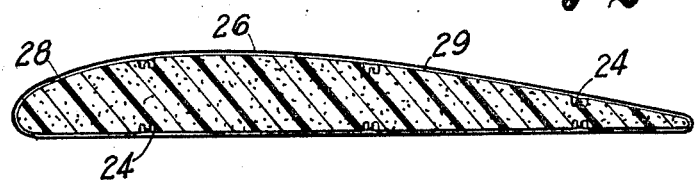
FIG. 3 is a side cross-sectional view of a wing for a drone aircraft molded by the method and apparatus set forth herein, and with a film of material covering the surface of the wing.
Figure 4:
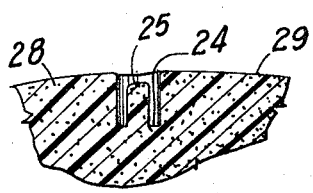
FIG. 4 is a partial enlarged view of a portion of the product formed by the mold of FIG. 1, showing the configuration of one of the protrusions and its recess.

The sectional mold 10 illustrated in the drawing is utilized for molding polystyrene aircraft wings for drone aircraft. Of course, it is desirable that aircraft wings are free of protrusions or any other obstructions which may function as spoilers. As with the wing shown in FIG. 3, coverings 26 are frequently applied to polystyrene aircraft wings. The wing of FIG. 3 includes covering 26 which is relatively thin, due to the desired light weight for aircraft. Since protrusions 25 are recessed within the normal surface of wing 28, the surface 29 of wing 28 is substantially smooth except for recesses 24. Covering 26 is chosen so that it has enough body to extend over recesses 24, to create a smooth exterior surface, in spite of recesses 24. Protrusions 25 extend outwardly of recesses 24 a distance sufficient to engage covering 26 if the portion of covering 26 which extends over recesses 24 is urged into the recess. Thus, protrusion 25 will prevent covering 26 from being broken in the area of recesses 24, as when the wing of the aircraft is being handled, or when the air pressure about the wing forces covering 26 into recesses 24.

While an aircraft wing is disclosed as the product formed by sectional mold 10 and the process disclosed herein, it should be understood that virtually any product can be formed by using a similar method and mold structure. Furthermore, while the product disclosed is fabricated of polystyrene, other expandable products can be molded with the use of a similar method or apparatus.

It will be obvious to those skilled in the art that many variations may be made in the embodiments here chosen for the purpose of illustrating the present invention, without departing from the scope thereof as defined by the appended claims.

I claim:
1. A method of forming an object fabricated of expandable polystyrene comprising:
   enclosing expandable polystyrene pellets in a mold cavity of a mold,
   injecting steam into the mold cavity through open ended tubular nozzles extending into the mold cavity a predetermined amount,
   expanding the polystyrene in the mold cavity to take the shape of the mold cavity and the nozzles whereby that portion of the expanded polystyrene extending into the nozzle lies below the outside surface of the formed object,
   cooling the mold while maintaining the position of the nozzles and,
   removing the mold and the nozzles from the expanded polystyrene to release the object having recesses therein formed by the nozzles and nipples in the recesses which lie below the outside surface of the object.

References Cited
UNITED STATES PATENTS

| | | | |
|---|---|---|---|
| 2,948,926 | 8/1960 | Kuhn | 264—51 X |
| 2,967,122 | 1/1961 | Talalay | 264—50 X |
| 3,015,132 | 1/1962 | Bunting | 264—51 X |
| 3,264,381 | 8/1966 | Stevens | 264—45 |

OTHER REFERENCES

Franson, G. R.: "Fabrication Method for Expandable Polystyrene," Plastics Technology, July 1956, pp. 452–455.

DONALD J. ARNOLD, Primary Examiner

P. A. LEIPOLD, Assistant Examiner

U.S. Cl. X.R.

264—45; 161—116, 161; 18—42